(No Model.) 2 Sheets—Sheet 1.
W. McADAMS, Jr.
DRIVE GATE.
No. 246,529. Patented Aug. 30, 1881.
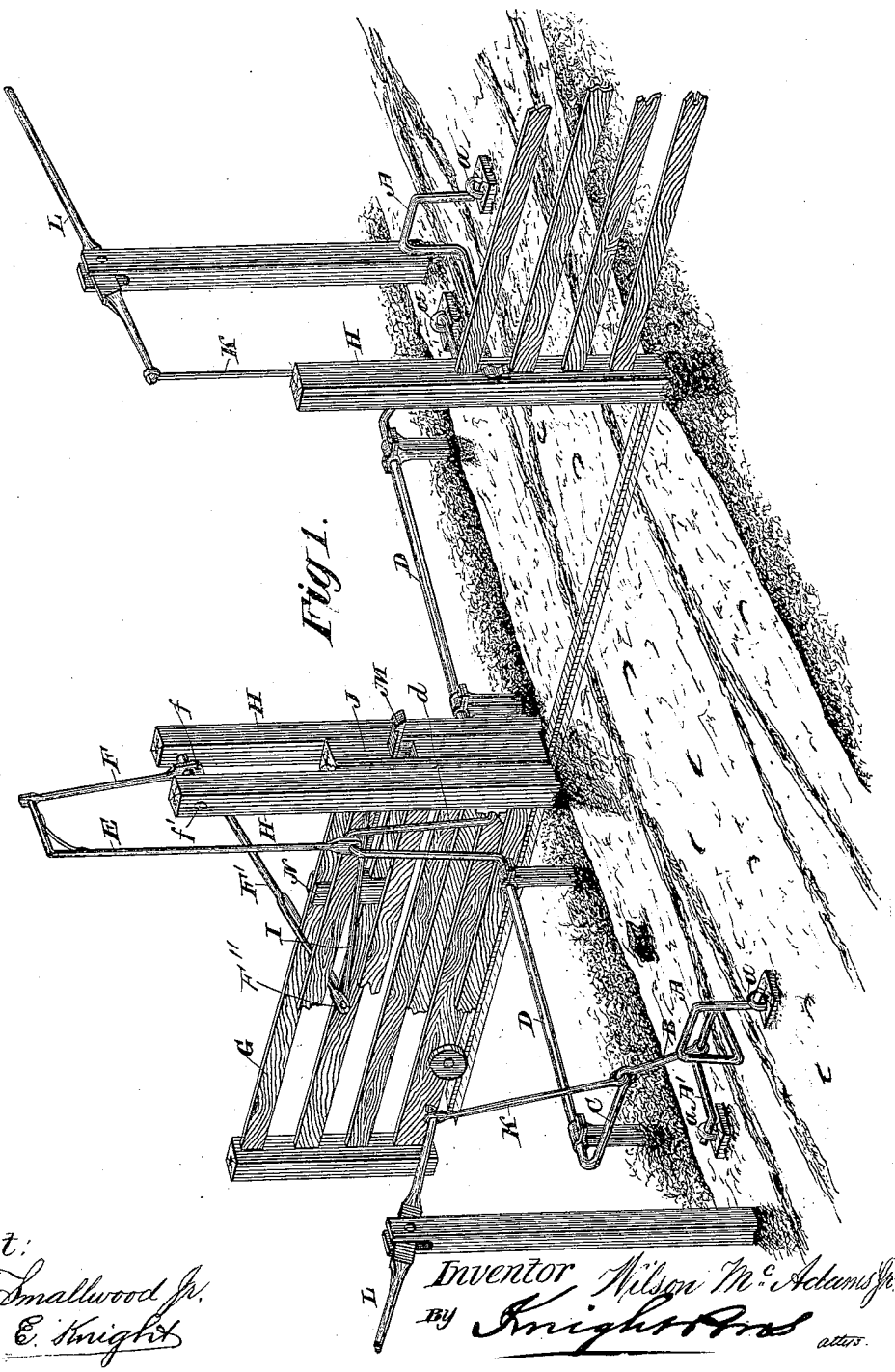

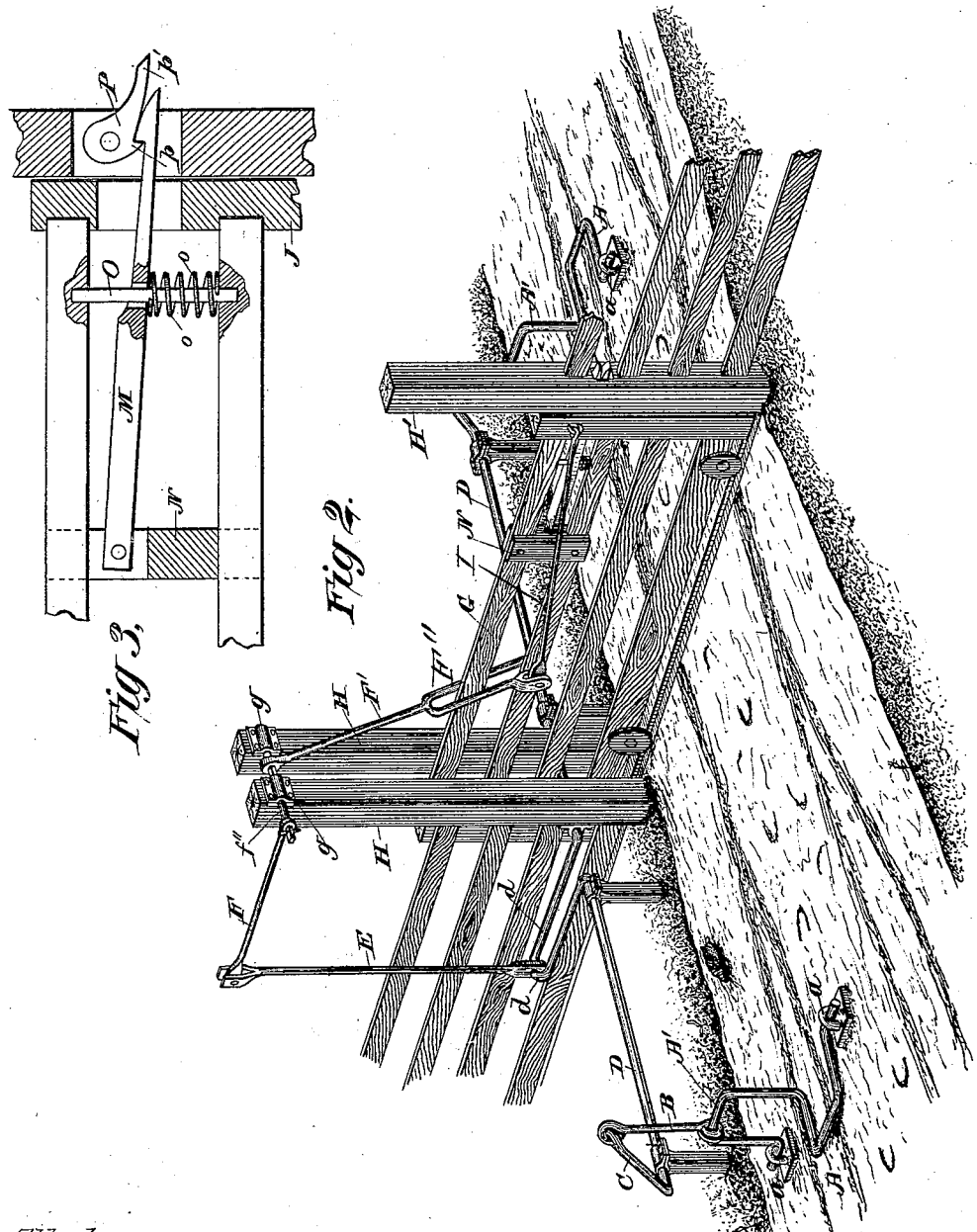

UNITED STATES PATENT OFFICE.

WILSON McADAMS, JR., OF RUSHSYLVANIA, OHIO.

DRIVE-GATE.

SPECIFICATION forming part of Letters Patent No. 246,529, dated August 30, 1881.

Application filed April 16, 1881. (No model.)

*To all whom it may concern:*

Be it known that I, WILSON McADAMS, Jr., a citizen of the United States, residing at Rushsylvania, in the county of Logan and State of Ohio, have invented Improvements in Drive-Gates, of which the following is a specification.

My improvement relates to those drive-gates in which a crank in the road-bed is actuated by the passage of the wheels over it to withdraw the gate; and my improvement consists in connecting a two-throw crank in the road-bed by a set of pivoted levers to a sliding gate, so that the said levers will, by the depression of the crank and consequent partial rotation of the crank-shaft in one or the other direction, roll the gate to its closed or open position.

My improvements further consist in a peculiar latch constructed and operated as hereinafter described.

In order that the invention may be fully understood, I will proceed to describe it with reference to the accompanying drawings, in which—

Figure 1 represents a perspective view of my improved gate in its open position. Fig. 2 is a perspective view of a modified form of the same closed. Fig. 3 is a view, partly in section, of the latch and surrounding portions of the gate and post.

The two-throw cranks A A' on either side of the gate G are journaled in straps or staples *a a*, screwed or otherwise attached either to the projecting ends of buried standards, as shown, or to planks fixed transversely in the road-bed. The crank-pins of the outer members, A', of the two-throw cranks A A' are journaled in the ends of vertically-reciprocating connecting-rods B, whose other ends are hinged on stubs on or in eyes, as shown, in the extremities of crank-arms C, projecting from a horizontal rock-shaft, D, extending through and to equal distances on each side of the gate. The rock-shaft D has a bend at one part near the gate, forming the double crank *d*, on the pin or wrist of which is journaled one end of a vertically-reciprocating rod E, the other end of which is hinged in the upper end of a bent lever, F F', which is fulcrumed at *f* on a pin or axis, *f'*, fixed in and between the inner gate-posts, H H. The lower end, F', of the said bent lever is forked to straddle the gate and permit the free horizontal movement of the gate, while preventing it from shaking or leaning over. To one arm, F'', of the forked lever F' is hinged the end of a vibrating rod, I, the other end of which is pivoted, by staple or otherwise, to the outer gate-standard, J. The two-throw cranks A A' on the opposite sides of the gate are reversely angled, as shown, so that when the gate is shut, both cranks A' will be vertical, and when open both cranks A' will be flat on the ground.

To the extremities of the cranks C are also hinged the ends of rods K, the other ends of which work on the ends of hand-levers L, fulcrumed in standards at the side of the road. These hand-levers are of suitable height to be worked from a wagon, and are used when, from any cause, the cranks A A' do not work.

Instead of the bent lever F, formed in one piece and fulcrumed on a stationary pin, *f'*, as shown in Fig. 1, I may use the mechanism shown in Fig. 2, the lever F F' being rigidly attached to the rocking axis *f''*, which is journaled in boxes *g* on the gate-posts; also, in place of the form shown, the crank C may project away from instead of over the road, and be connected to an additional crank on the shaft of crank A, extended for that purpose. With the device in this form, the rods K being lengthened to reach the ends of cranks C, the gate is opened by a downward pull of the hand-lever L instead of an upward thrust, as in the device represented.

My improved latch is constructed as follows: A vertically-vibrating latch, M, is pivoted at one end in the cross-piece N, joining two adjacent boards of the gate, and is held to a vertical vibration by pin O, fixed in the gate-boards and passing through a slot in the latch. The free end of the latch passes through a slot in the gate-standard J, and when the gate is shut enters a similar slot in the gate-post H', where it is held by a dog or projection, *p*, on the keeper P. A spring, *o*, holds the latch closely against the surface of the keeper. The keeper P is formed with a tongue, *p'*, the lower surface of which is curved so as to form a cam. It will be seen that while this latch will hold the gate tightly against the post and prevent it being opened by slight force, yet a direct backward pull, such as is applied by my opening mechanism, will cause the latch M to rotate its keeper by pulling on the dog p, and as the keeper rotates the cam p' will force down the latch and free it from the dog, thus releasing the gate.

Supposing my gate to be in its locked position, it is opened for the passage of a vehicle as follows: The wheels being directed to the (for the time being) erect portion of the two-throw crank A A', will give it a one-quarter revolution, and the motion, being communicated by rod B and crank C to shaft D, will rock the said shaft, which, through the medium of crank d, rod E, and lever F F', will impart a direct pull to rod I, freeing the latch and opening the gate. On reaching the other side of the gate the wheels, being directed over the then erect member of the crank A A', act by movements the reverse of those above recited to close the gate.

Having thus described my invention, the following is what I claim as new therein and desire to secure by Letters Patent:

1. The combination, with a sliding or rolling gate and two-throw cranks in the road-bed on each side of the gate, of the vertically-reciprocating connecting-rods B, crank-arms C, horizontal rock-shaft D, having double crank d, bent lever F, forked at its lower end, and vibrating rod I, substantially as and for the purpose set forth.

2. The combination of two-throw cranks A A', bent rock-shaft D, having link-connection with cranks A A' and crank-portion d, rod E, lever F F', fulcrumed on the gate-posts and loosely connected at its other end to the sliding gate, substantially as described.

3. The combination of a drive-gate provided with a vertically-vibrating spring-latch, cross-piece N, and a gate-post provided with a keeper, P, having dog or projection p and cam-shaped tongue p', substantially as and for the purpose described.

WILSON McADAMS, Jr.

Witnesses:
JOHN KAUTZMAN,
J. A. CARAHOOF.